J. A. PERKINS.
DUST GUARD.
APPLICATION FILED MAR. 22, 1906.
1,064,371.
Patented June 10, 1913.
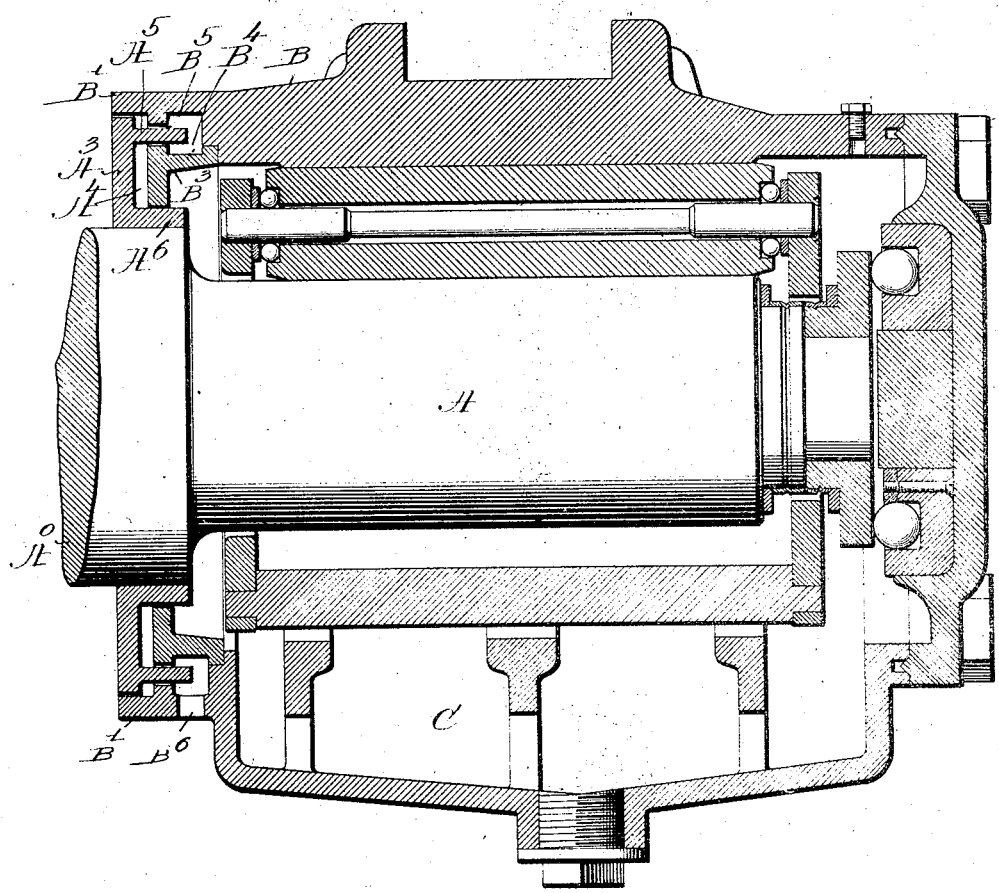
Witnesses:
Fred S. Greenleaf
Edward H. Allen
Inventor
Julius A. Perkins
by Crosby & Gregory
Attys.

UNITED STATES PATENT OFFICE.

JULIUS A. PERKINS, OF OMAHA, NEBRASKA, ASSIGNOR, BY MESNE ASSIGNMENTS, TO UNITED STATES ROLLER BEARING COMPANY, OF JERSEY CITY, NEW JERSEY, A CORPORATION OF NEW JERSEY.

DUST-GUARD.

1,064,371.  Specification of Letters Patent.  Patented June 10, 1913.

Original application filed August 14, 1903, Serial No. 169,500. Divided and this application filed March 22, 1906. Serial No. 307,522.

*To all whom it may concern:*

Be it known that I, JULIUS A. PERKINS, a citizen of the United States, and resident of Omaha, in the county of Douglas and State of Nebraska, have invented an Improvement in Dust-Guards, of which the following description, in connection with the accompanying drawing, is a specification, like letters on the drawings representing like parts.

This invention relating to anti-friction or roller bearings is comprised in a dust guard which is not only dust but also water and oil tight.

This guard comprises a collar on the shaft at the inner end of the journal, said collar having at its side toward the nearest end of the journal a wide groove and projecting parallel flanges, the inner flange surrounding the inner end of the journal. The complemental part of the tight guard comprises a flange extended from the inner end of the stationary box and overlapping and nearly touching the outer flange of the collar referred to, and a flanged ring secured to the inner end of the box inside the flanged end thereof, said ring entering the wide space of the collar, a part of the periphery of the ring which has an annular groove nearly touching the inner side of the outer flange of said collar, the inturned flange at the outer end of said ring nearly touching the inner side of the innermost flange of the collar, thereby preventing the escape of oil from the residuum chamber which is substantially filled with oil.

Opposite the annular groove of the ring referred to, the box has a complemental groove. These grooves constitute a waterway, and the end of the box and collar so constructed serve to prevent dust and water from entering the box and also prevent oil escaping from the box. The waterway of the box at a point below the journal has an outlet.

The drawing shows part of an axle in elevation and the box, dust guard and other parts in longitudinal section.

A represents the journal of a car axle $A^0$. The axle near the inner end of the journal is surrounded by a collar $A^3$ the inner side of which next the box presents a space $A^4$ leaving an exterior flange $A^5$ and an interior flange $A^6$.

The box B has on its rear end a flange $B'$, and inside said flange the box has extended from it and fast with relation thereto a ring $B^3$ having its outer end flanged, the width of the flanged end of the ring at its outer end being such as to nearly fill the space $A^4$ in the collar, $A^3$, an inturned flange of the ring $B^3$ substantially touching the inner side of the interior flange $A^6$ of said collar thus preventing the escape of oil from the residuum chamber of the box. The residuum or oil chamber is described in my United States Patent No. 900199 dated October 6, 1908, the present application being a division of the application Ser. No. 169500, filed August 14, 1903, on which said patent was granted. The exterior of the ring $B^3$ has an annular groove $B^4$, and the flanged end of the box opposite said groove has an annular groove $B^5$.

When the box and shaft are in running condition, as in the drawings, the outer flange of the box substantially overlaps the collar and nearly touches the same, and the outer flange of the collar enters the space between the inner side of the flange of the box and the exterior of the ring connected with the box, the end of the flange $A^5$ entering the annular groove $B^5$ and space $B^4$, which constitute a waterway having an outlet $B^6$ below the journal.

The collar and box constructed as described prevent water and dust entering the bearing so as to injure the bearing rollers and journal, and at the same time the oil in the residuum-receptacle C in the bottom of the box is prevented from escapement from the box.

Having fully described my invention, what I claim as new and desire to secure by Letters Patent is:—

1. In a roller bearing, a collar having two inturned and concentric flanges to present an annular space between them, a box having an annular flange surrounding and approaching closely the periphery of said collar, and a ring fixedly mounted on the box concentric with the collar and having a flange in a plane at right angles to the axis of the ring and entering the annular space between the flanges of the collar, said ring and the surrounding flange on the box presenting between them a space into which enters the exterior flange of the collar and substantially closes the same.

2. A bearing comprising a box having at its inner end a projecting annular flange and a fixed ring overlapped by said flange, the ring having a flange in a plane at right angles to the axis of the journal, a journal within said box, a collar surrounding and rotating with said journal and having two inturned concentric flanges forming between them an annular space at the side of the collar facing the box, the collar substantially closing the opening between the flange of the box and the journal, the flanged end of the ring entering and substantially closing the annular space of the collar but being disengaged from the latter, and the outer flange of the collar entering freely the space between the flange of the box and the outer circumference of the ring.

3. In a bearing, an axle, a collar thereon presenting at the side next the end of the journal a flange surrounding a space, a box having at its inner end a flange nearly touching the collar and provided with an outlet and inside said flange a flanged ring, the periphery of the ring being grooved for a waterway, the flange of the collar entering the space between the flange and ring of the box whereby water entering the space between the flange of the box and the collar may flow from the outer end of the flange of the collar into the waterway and thence escape through the outlet in the box.

4. In a bearing, an axle having a journal, a collar on said axle near an end of said journal, presenting at its side next the journal a flange surrounding a space, a box having at its end a flange provided with an outlet and inside said flange a flanged ring, the periphery of the ring and the inner side of the flange of the box being each grooved to constitute a waterway, the flange of the collar entering the space between the flange and ring of the box whereby water entering the space between the flange of the box and the collar may flow from the flange of the collar into the waterway and thence escape through the outlet of the box.

5. In a bearing, an axle having a journal, a chambered collar on said axle near said journal, a box having at its bottom a residuum-chamber to contain oil, and a flanged ring fixed to and extended from the end of said box and adapted to enter and move freely in the chamber of said collar, the flange of said ring being inturned toward the axle for a distance to prevent oil in said residuum-chamber from escaping from the end of the box sustaining said ring.

In testimony whereof, I have signed my name to this specification, in the presence of two subscribing witnesses.

JULIUS A. PERKINS.

Witnesses:
A. L. NORMAN,
THOMAS B. MCCREADY.